Patented May 5, 1942

2,282,190

UNITED STATES PATENT OFFICE 2,282,190

MULTICELLULAR CEMENTITIOUS COMPOSITION

Joseph Jahjah, Beyrouth, Republic of Lebanon, Syria, assignor of one-third to H. A. Bitar and one-third to George E. Atiyeh, both of Portland, Oreg.

No Drawing. Application August 11, 1939, Serial No. 289,587. In the Republic of Lebanon November 16, 1937

2 Claims. (Cl. 106—87)

This invention relates to a method of manufacture of concrete blocks, slabs and similar structural units, in which the concrete, while in the wet state, is combined with an aerated foam for creating in said products an infinite number of uniformly distributed bubbles or cells, thereby to materially reduce the weight of said products, and to increase their insulating properties; the invention pertaining more particularly, however, to a new and improved composition of matter for creating a strong, tough foam having properties which cause it to persist or remain in place or existence even when subjected to agitation in the presence of cement and aggregates, as in a concrete mixer.

Notwithstanding that heretofore men have conceived that structural units of artificial stone and the like could be made to contain air or gas bubbles in their plastic state to create a cellular structure in the final product, the fact remains that as yet no such product has been provided which is merchantable in competition with other existing products. It has appeared either that the methods of production of such products are so expensive as to preclude their being offered competitively, so far as price is concerned, or that the strength or wearing qualities of the product are so much impaired by an uneven distribution of the cells, or by the action of ingredients incorporated therein during manufacture, that they have not met with favor in the building trades.

A primary difficulty met with in the production of artificially produced cellular structural material has been the inability to produce a cellular product having a uniformly distributed cell structure throughout each unit. Particularly has this been true of precast blocks or slabs and the like. These units are cast in molds, the material comprising a cementitious material derived from a mixture of a rapidly setting product such as plaster of Paris or calcined gypsum, and water, and either with or without aggregates, which mixture, after being poured into the molds, is expanded by the addition of substances capable of reacting to evolve a gas. A disadvantage resulting from this procedure is the fact that the lower portion of the finished product is quite dense, in fact almost solid and comparatively free from cells; whereas in the same unit the upper portion is frequently so porous as to have little or no strength. Notwithstanding various attempts have been made to overcome this difficulty, as by the use of closed molds, and closed molds which provide for the escape of air, surplus gas or excess water, the difficulty above mentioned has persisted to the extent that precast cellular structural units have not been commercially practicable. A further difficulty has been the use of chemicals which react with the passage of time to disintegrate the cement and cause the block or slab to crumble. This difficulty is most apparent in those units in the manufacture of which a preformed foam is stirred into the cementitious materials while in a plastic state.

In more recent years efforts have been made to create structural units having an artificially produced cellular structure, such units being composed substantially of a hydraulic cement and water, either with or without aggregates, and having incorporated thereinto a foam usually comprising the reaction product of powdered soap bark and water. The use of powdered soap bark, however, does not produce a foam of adequate permanence for a greatly lengthened time of set of precast structural units, and it has been necessary to limit the use of this reagent with a plastic solution containing plaster of Paris or calcined gypsum or similar products which set rapidly, before the foam has had time to lose its cellular structure. Up to the present time it is not believed that solutions of powdered soap bark and water have been used successfully with Portland cement, or any hydraulic cement, which requires a greatly lengthened time for setting. Tests which have been completed using foam made of a solution composed of powdered soap bark and water and stirred into a plastic solution of Portland cement have proven the inadequacy of the foam thus created, either because the stirring action necessary to thoroughly mix the foam with the cement acted to break down the bubbles of foam, or because the time which elapsed before the cement had set was longer than the life of the bubbles created by the foaming agent. At any rate, it is apparent that structural units comprising a hydraulic cement and water, either with or without aggregates, and incorporating therein an artificially produced cellular structure, have not found use in the building trades.

The present invention has particular reference to a composition of matter which, when compounded in the manner hereinafter explained and subjected to violent agitation, produces a strong, tough foam having properties which cause it to persist or remain in place or existence for the greatly lengthened period of time required to permit a hydraulic cement to set. By mixing this foam with a hydraulic cement and water, either with or without aggregates, a structural material is obtained which is characterized by the presence of an infinite number of uniformly distributed bubble-like cells. The weight of the product is determined by the size and density of the bubbles and by the presence and character of the aggregates. Structural units made without sand may weigh from 11 to 20 pounds per cubic foot, and when made with sand may weigh from 14 to 25 pounds per cubic foot. The ultimate strength is shown by tests which have indicated a resistance of approximately 200 pounds pressure per square inch, the test block weighing 16.6 pounds per cubic foot.

The objects of the invention include, among others, the provision of a new process by which multicellular blocks or slabs and the like may be produced; the provision of a new process for producing foam suitable for mixing with a hydraulic cement, and with or without sand, to produce multi-cellular blocks; the provision of a new composition of matter for producing foam having special properties of consistency and cohesion which adapt it for use in the manufacture of multicellular material; the provision of a new water resistant material; the provision of a new material of light weight and low cost and capable of use in wide ranges of structural application; the provision of a new liquid compound capable of receiving and retaining gaseous bubbles and of carrying said bubbles into a mixture containing hydraulic cement for the manufacture of multicellular structural units; and the provision of a new product derived from a liquid compound and adapted to be mixed with a mixture of cement, sand and water, or cement and water, to produce multicellular structural units.

This application is a continuation in part of an application identified as Serial No. 233,414, filed October 5, 1938, entitled Multicellular cementitious composition.

The invention is embodied in a composition of ingredients which together produce a liquid capable of being beaten into a foam. If the proper proportions of the ingredients are used, and the mixture properly manipulated after mixing, a foam is produced having properties which cause it to be of sufficient permanence to not only withstand the disrupting action of a concrete mixer, but to cause it to persist and retain its cellular structure until after the cement has had time to set.

Specific examples of the composition and the process of compounding the same are hereafter set forth. Each formula calls for a specified amount of water, and each recites that the water is incorporated into the solution at different stages of its preparation. It should be stated, however, that the solutions may be compounded by commencing the preparation thereof with the full amount of water required therefor, and that the processes enumerated are not dependent upon the water being incorporated into the solution at different times in different amounts. The manner of compounding the solutions, as hereinafter set forth, is deemed the most practicable, particularly with reference to cooling the solution by adding thereto a portion of the water as cold water. It will be appreciated, however, that the full amount of the water may be used initially, and the cooling step be accomplished with the aid of cooling coils and the like.

*Formula No. 1.*—Into a container containing 3 liters of hot water is added 175 grams of animal glue, 75 grams of ammonia alum, 55 grams caustic soda, and 75 grams colophene. The mixture is heated for about fifteen minutes at 212° F., and then cooled. At the beginning of the cooling step there is added to the mixture 10 grams of aluminum powder. Thereupon there is added to the mixture 4 liters of water, and if this be cold water the cooling step will be greatly accelerated. Thereupon the solution is vigorously agitated until the liquid is entirely beaten into a stiff foam. The foam is delivered from the agitator into a reservoir from which it is measured by volume into a concrete mixer.

The amount of foam to be used is determined by the texture and number of blocks or slabs which are to be produced, as well as by the intended weight of such units. In preparing the final mixture, to one sack of cement, with or without sand, there is added 36 liters of water. Sand, if used, is added in the proportion of two parts of sand for each one part of cement. Into a concrete mixer containing one sack of cement and 36 liters of water, with or without aggregates, is added 33 cubic inches of foam. The cement mixer distributes the foam in the mixture of cement and water, or in the mixture of cement, sand and water, and after about four minutes of this operation the product may be emptied into molds to form blocks or slabs, or may be poured directly into forms to create insulated walls or roofs.

In addition to the manner of compounding the liquid for producing the foam hereinabove set forth, the following formulas, when compounded in the manner indicated, will produce equally good results.

*Formula No. 2.*—To 3 liters of hot water add 200 grams animal glue, 75 grams ammonia alum, and 30 grams sodium bichromate. This solution is heated for about fifteen minutes at 212° F., and then cooled. At the beginning of the cooling step there is added to the solution 40 grams quillaja powder, 30 grams ammonium hydroxide, 75 grams silicate of soda and 4 liters of water. Thereupon, the solution having cooled, it is subjected to violent agitation to produce foam.

*Formula No. 3.*—To 3 liters of hot water add 225 grams animal glue, 100 grams ammonia alum, and 30 grams sodium bichromate. The solution is heated for about fifteen minutes at 212° F., and then cooled. During the cooling step there is added 30 grams ammonium hydroxide, 75 grams silicate of soda, and 4 liters cold water. The solution is then beaten into a stiff foam.

*Formula No. 4.*—To 3 liters of hot water add 250 grams animal glue, 100 grams ammonia alum and 30 grams sodium bichromate. The solution is heated for about fifteen minutes at 212° F., and then cooled. During the cooling operation there is added 75 grams colophene, 100 grams silicate of soda, and 4 liters of cold water. The solution may thereupon be beaten into a strong, tough foam.

As has been stated, when the liquid has been compounded it is introduced into a beater and subjected to violent agitation. This action serves to aerate the liquid, both by whipping or beating air into the liquid, and by causing chemical reactions which evolve gases. The action of the beater produces a foam which has properties which cause it to persist or retain its cellular formation, even though subsequently subjected to the stirring action of a concrete mixer.

Thereupon, the foam is measured into a mixer into which is introduced the requisite amount of cement and water, with or without aggregates, to make a mixture for pouring into molds or forms. The mixer introduces the foam into the mixture of cement and water, and these materials spread over and through the foam and seal the gaseous bubbles within the body of the product. After the foam is thoroughly mixed into the mixture of cement, sand and water, the product is poured into molds or forms to set. The resulting product is multi-cellular in character, and is at once waterproof and sound proof, and presents extraordinary resistance to thermal conductivity. Moreover, blocks or slabs embodying applicant's invention weigh but a fraction of the weight of cement or concrete blocks or slabs of like dimensions made in the usual manner. In the wide range of structural uses for which such products are applicable are walls, partitions, terraces, roofs; in fact, every conceivable structural part.

In addition to its foaming properties, the liquid compound is a waterproofing agent, and when added to the concrete mix in liquid form, gives to the final product a remarkable degree of waterproofness. Likewise, a quantity of the liquid may be added to the mortar and to the cement mix to be used for the coping and facing for waterproofing the protective covering.

Having now described my invention and in what manner the same may be used, what I claim as new and desire to protect by Letters Patent is:

1. The process of manufacturing a multicellular block, slab, or the like, having a substantially uniform density throughout, comprising adding animal glue, ammonia alum, caustic soda and colophene to a quantity of hot water, adding a quantity of aluminum powder and cold water, vigorously agitating the solution until it is entirely beated into a stiff, persistent foam, mixing said foam into a mixture of cement and water, and then causing said mixture to set in the form of a block, slab, or the like with said foam creating hollow cells uniformly dispersed throughout the mass of material.

2. A buoyant, multicellular block, slab or the like resulting from the setting of a mixture of cement, water and a stiff, persistent foam, said foam containing for each seven liters of water substantially 175 grams of animal glue, 75 grams of ammonia alum, 55 grams of caustic soda, 75 grams of colophene, and 10 grams of aluminum powder, said block having a substantially uniform density throughout, and substantially all of the material therein forming thin intercell walls.

JOSEPH JAHJAH.